(No Model.)

E. W. RICE, Jr.
MEANS FOR REGULATING MULTIPHASE CURRENTS.

No. 508,638.  Patented Nov. 14, 1893.

WITNESSES.
A. F. Macdonald.

INVENTOR.
Edwin William Rice Jr.
By Burke & Blodgett
Attys

United States Patent Office.

EDWIN WILBUR RICE, JR., OF LYNN, MASSACHUSETTS, ASSIGNOR TO THE THOMSON-HOUSTON ELECTRIC COMPANY, OF CONNECTICUT.

MEANS FOR REGULATING MULTIPHASE CURRENTS.

SPECIFICATION forming part of Letters Patent No. 508,638, dated November 14, 1893.

Application filed January 19, 1892. Serial No. 418,556. (No model.)

*To all whom it may concern:*

Be it known that I, EDWIN WILBUR RICE, Jr., a citizen of the United States, residing at Lynn, in the county of Essex and State of Massachusetts, have invented certain new and useful Improvements in Means for Regulating Multiphase Currents, of which the following is a specification.

My invention relates to means of regulating multiphase currents and has for its object to provide such a means, which will admit of the simultaneous regulation of the currents in each of the circuits of the multiphase or three-phase apparatus, whereby the displacement of the phase is prevented and an effective regulation secured.

The accompanying drawings show a method of applying my invention.

Figure 1:
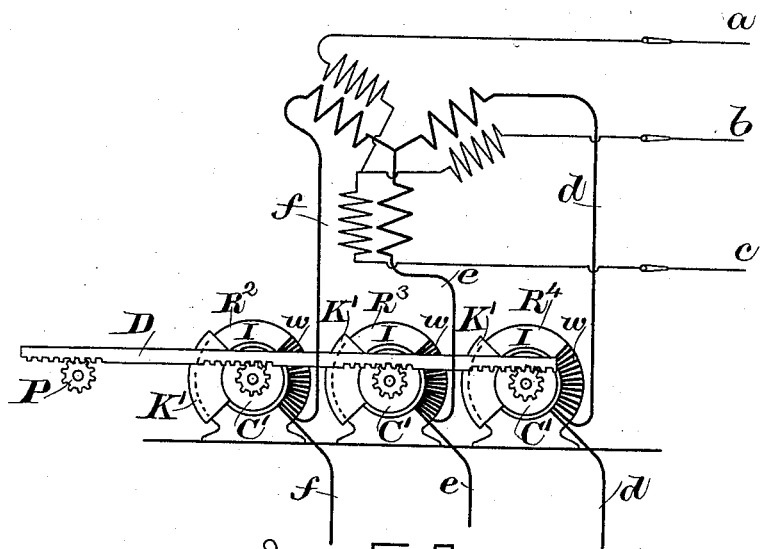
Figure 2:
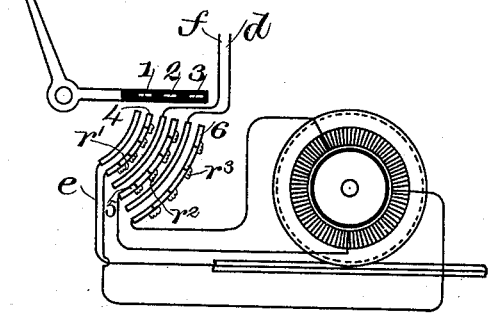

Figure 1 shows a method of simultaneous regulation employing reactive coils, and Fig. 2 a method employing a rheostatic arrangement.

In each of the three mains $a$, $b$, $c$, or in a secondary circuit placed in inductive relation to such mains, and supplying the motor as $d$, $e$, $f$, are three inductive devices which are electrically and magnetically independent but mechanically connected so as to be simultaneously operated. They are shown in Fig. 1 as three inductive devices, $R^4$, $R^2$, $R^3$, consisting of an iron ring I, I, I, around a certain portion of which is wound the circuit to be regulated $d$, $e$, $f$, and a central revoluble hub $C'$, $C'$, $C'$, carrying a heavy closed conductor $K'$, $K'$, $K'$, which may be moved by the rack D and pinion P, so that the hubs $C'$, $C'$, $C'$, are rotated together and the closed copper conductors or heavy closed bands $K'$, $K'$, $K'$, be made to occupy different positions on the ring I, I, I. In the position shown the devices $R^4$, $R^2$, $R^3$ act as powerful "kickers" to prevent the passage of current through $d$, $e$, $f$, to the motor or other translating device. When the heavy closed conductor or bands $K'$, $K'$, $K'$, are placed directly over the windings $w$, $w$, $w$, the self inductive effect of the core is neutralized and the maximum current can flow to the translating devices. The placing of the conductor $K'$ in intermediate positions between these extremes gives any desired regulation. This regulating device may be used either on the cars to regulate the speed, or at the central station to regulate the current supply. In fact it may be used in any application of three phase systems or other alternating systems in which it is desired to simultaneously vary the current in several alternating circuits.

In Fig. 2 a regulating device embodying my invention is shown, applied to control the current to a three phase motor. The connections $d$, $e$, $f$, from the three traveling connections are taken to three separate contacts, constituting electrically separate circuit controllers, and these contacts co-operate with switching contacts 1, 2, 3, and rheostat contacts 4, 5, 6, to simultaneously make, break and vary the strength of the current in the three motor connections. The resistances $r'$, $r^2$, $r^3$ connecting the rheostat contacts may or may not be self inductive, but have preferably considerable self induction.

While I have shown and described the application of my invention to a three-phase system of distribution, yet it is not necessarily confined thereto, but may be used in a system having any desired number of phases, as indicated in paragraph two of page 1. The arrangement of the additional conductors employed in other than a three-phase system need not be particularly described, since it will be readily understood by those skilled in the art.

What I claim as new, and desire to secure by Letters Patent, is—

1. The combination with a number of conductors carrying multiphase currents, of adjustable current varying devices in the separate conductors, and an actuator connected to said devices to operate them simultaneously.

2. The combination with a number of conductors carrying multiphase currents, of adjustable current varying devices in separate conductors, and connected to and operated by, a common actuator.

3. The combination with a plurality of conductors carrying multiphase currents, of an adjustable current varying device in each conductor, and an actuating means connected to all of said devices, to operate them simultaneously.

4. The combination with a plurality of conductors carrying alternating currents and an adjustable reactive or counter electromotive force device in each conductor, of an actuator connected to all of said reactive devices.

5. The combination with a number of conductors carrying multiphase currents of a multiphase motor connected to such conductors, circuit controllers in the several conductors, and an actuating device connected to and operating the several circuit controllers.

In witness whereof I have hereunto set my hand this 13th day of January, 1892.

EDWIN WILBUR RICE, JR.

Witnesses:
JOHN W. GIBBONEY,
ELIHU THOMSON.